United States Patent
Zhao et al.

(10) Patent No.: US 12,351,517 B2
(45) Date of Patent: Jul. 8, 2025

(54) METHOD FOR PREPARING SILANE COUPLING AGENT/SILICA/PLANT FIBER COMPOSITE

(71) Applicant: CHANGZHOU INSTITUTE OF TECHNOLOGY, Changzhou (CN)

(72) Inventors: Li Zhao, Changzhou (CN); Chenyi Liu, Changzhou (CN); Jie Li, Changzhou (CN); Xiaoyun Cao, Changzhou (CN); Xinping Guo, Changzhou (CN); Rui Zhu, Changzhou (CN)

(73) Assignee: CHANGZHOU INSTITUTE OF TECHNOLOGY, Changzhou (CN)

( * ) Notice: Subject to any disclaimer, the term of this patent is extended or adjusted under 35 U.S.C. 154(b) by 533 days.

(21) Appl. No.: 17/883,282

(22) Filed: Aug. 8, 2022

(65) Prior Publication Data

US 2023/0043739 A1   Feb. 9, 2023

(30) Foreign Application Priority Data

Aug. 6, 2021   (CN) .......................... 202110899668.4

(51) Int. Cl.

| | |
|---|---|
| *C04B 26/32* | (2006.01) |
| *C04B 16/02* | (2006.01) |
| *C04B 16/12* | (2006.01) |
| *C04B 20/00* | (2006.01) |
| *C04B 20/10* | (2006.01) |
| *C04B 111/00* | (2006.01) |
| *C04B 111/10* | (2006.01) |

(52) U.S. Cl.
CPC .............. *C04B 26/32* (2013.01); *C04B 16/02* (2013.01); *C04B 16/12* (2013.01); *C04B 20/0068* (2013.01); *C04B 20/1014* (2013.01); *C04B 20/1051* (2013.01); *C04B 20/1074* (2013.01); *C04B 2111/00017* (2013.01); *C04B 2111/1037* (2013.01)

(58) Field of Classification Search
CPC ......... C04B 26/32; C04B 16/02; C04B 16/12; C04B 20/0068; C04B 20/1014
See application file for complete search history.

(56) References Cited

FOREIGN PATENT DOCUMENTS

| CN | 106977126 | * | 4/2017 |
|---|---|---|---|
| CN | 109650845 | * | 2/2019 |

\* cited by examiner

*Primary Examiner* — Nathan T Leong
(74) *Attorney, Agent, or Firm* — Bayramoglu Law Offices LLC

(57) ABSTRACT

A method for preparing a silane coupling agent/silica/plant fiber composite includes the following steps: S1: pretreating plant fiber; S2: preparing hydrolysate of a silane coupling agent; S3: preparing a silane coupling agent/plant fiber composite; S4: preparing a silica nanoparticle dispersion; and S5: preparing a silane coupling agent/silica nanoparticle/plant fiber composite. Through the covalent interaction among a silanol group (Si—OH) formed by hydrolysis of the silane coupling agent, Si—OH of the silica, and a hydroxyl group (—OH) on the surface of the plant fiber, the present invention enables silica nanoparticles to be grafted on the surface of the plant fiber. Using a hydrophobic film formed by the silane coupling agent, harmful ions are prevented from invading, and the volume stability of the fiber is improved. Using the pozzolanic activity of the silica nanoparticles, the alkalinity and calcium hydroxide content around the fiber are reduced.

10 Claims, 2 Drawing Sheets

METHOD FOR PREPARING SILANE COUPLING AGENT/SILICA/PLANT FIBER COMPOSITE

CROSS REFERENCE TO THE RELATED APPLICATIONS

This application is based upon and claims priority to Chinese Patent Application No. 202110899668.4, filed on Aug. 6, 2021, the entire contents of which are incorporated herein by reference.

TECHNICAL FIELD

The present invention relates to the technical field of building materials, and in particular relates to a method for preparing a silane coupling agent/silica/plant fiber composite.

BACKGROUND

Cement-based materials are currently the most widely used building materials in the world, but they are brittle and prone to cracking. Studies have shown that fiber has a good inhibitory effect on cracking of cement-based materials. Steel fiber and artificial synthetic fiber can improve the toughness of concrete to a certain extent, but also increase the cost of concrete. To effectively reduce the cost of fiber reinforced concrete, researchers start to use cheap, easily available, and widely distributed plant fiber in nature to replace the traditional artificial synthetic fiber. The application of plant fiber to cement-based composite materials can improve toughness, promotes sustainable development, has ecological effects and is in line with the major strategy of developing a circular economy.

A strong interfacial bonding property between fiber and a cement matrix is a necessary condition for a fiber-modified cement-based composite material to obtain high toughness. However, the interfacial bonding property between plant fiber and a cement matrix is insufficient, and the plant fiber needs to be subjected to surface modification to improve the interfacial bonding property between the plant fiber and the cement matrix. The lack of corrosion resistance of plant fiber in a cement-based composite material also limits its application in the field of building materials. Calcium hydroxide produced by cement hydration dissolves in water, making a pore solution of cement paste alkaline. An alkaline environment may dissolve hemicellulose and lignin in plant fiber, destroy the structure of the fiber, and reduce the strength and toughness of the fiber. In addition, calcium ions enter the internal pores of plant fiber and crystallize, making the fiber "mineralized", gradually lose flexibility, become rigid, and prone to brittle fracture. Therefore, improving the corrosion resistance of plant fiber in the cement matrix and improving the interfacial bonding property between the plant fiber and the cement matrix are the prerequisites for replacing artificial synthetic fiber with plant fiber to toughen a cement-based composite material.

SUMMARY

To solve the problems of insufficient corrosion resistance and interfacial bonding property of plant fiber in a cement matrix, the present invention provides a method for preparing a silane coupling agent/silica/plant fiber composite. Through the covalent interaction among a silanol group (Si—OH) formed by hydrolysis of the silane coupling agent, Si—OH of the silica, and a hydroxyl group (—OH) on the surface of the plant fiber, the method enables silica nanoparticles to be firmly grafted on the surface of the plant fiber. Using a hydrophobic film formed by the silane coupling agent, harmful ions are prevented from invading, and the volume stability of the plant fiber is improved. Using the pozzolanic activity of the silica nanoparticles, the alkalinity and calcium hydroxide content around the fiber are reduced, a microstructure at the interface between the fiber and a cement matrix is improved, and the corrosion resistance of the plant fiber in the cement matrix and the interfacial bonding property between the fiber and the matrix are synergistically improved. The method of the present invention is simple and easy to operate, and is expected to be applied in the green building industry on a large scale to reduce the carbon emission of buildings.

The present invention is achieved through the following technical solutions:

A method for preparing a silane coupling agent/silica/plant fiber composite, which includes the following steps:

S1: pretreating plant fiber;

S2: preparing hydrolysate of a silane coupling agent;

S3: preparing a silane coupling agent/plant fiber composite: fully immersing the pretreated plant fiber in the hydrolysate of the silane coupling agent, fishing the plant fiber out, and drying the plant fiber in the air to maintain the activity of the silane coupling agent;

S4: preparing a silica nanoparticle dispersion; and

S5: preparing a silane coupling agent/silica nanoparticle/plant fiber composite: spraying the silica nanoparticle dispersion onto the silane coupling agent/plant fiber composite, and drying the composite.

Through the covalent interaction among a silanol group (Si—OH) formed by hydrolysis of the silane coupling agent, Si—OH of the silica, and a hydroxyl group (—OH) on the surface of the plant fiber, the method of the present invention enables silica nanoparticles to be firmly grafted on the surface of the plant fiber. Using a hydrophobic film formed by the silane coupling agent, harmful ions are prevented from invading, and the volume stability of the plant fiber is improved. Using the pozzolanic activity of the silica nanoparticles, the alkalinity and calcium hydroxide content around the fiber are reduced, a microstructure at the interface between the fiber and a cement matrix is improved, and the corrosion resistance of the plant fiber in the cement matrix and the interfacial bonding property between the fiber and the matrix are synergistically improved.

Specifically, the plant fiber may be selected from sisal fiber, coir fiber and other plant fiber.

Further, in step S1, the plant fiber is pretreated by the following steps:

S1-1: cutting the plant fiber according to requirements of a cement-based composite material to be toughened;

S1-2: cleaning the surface of the cut plant fiber, that is, cleaning off impurities from the surface of the plant fiber with clean water; and S1-3: soaking the cleaned plant fiber in an alkaline solution, washing the soaked plant fiber to a neutral state, and drying the plant fiber.

Further, in step S1-3, the alkaline solution is an NaOH or KOH solution with the pH of 13-14; the soaking time is 0.5-1 h; and the drying temperature is 60-80° C.

Further, in step S2, the hydrolysate of the silane coupling agent is prepared by the following steps:

S2-1: dissolving the silane coupling agent in a mixed system of absolute ethanol and deionized water, and stirring the mixed system evenly to obtain a mixed solution; and S2-2: adding glacial acetic acid to the mixed solution to adjust the pH to an acidic state, and stirring the mixed solution to obtain the hydrolysate of the silane coupling agent.

Further, the silane coupling agent in step S2-1 is any one selected from of KH550, KH560, KH570, and KH792; the volume ratio of the absolute ethanol to the deionized water is (4-10):1; and the concentration of the silane coupling agent in the mixed solution is 0.1-1.0 mol/L.

Further, in step S2-2, 10-30 wt % of glacial acetic acid is added to the mixed solution to adjust the pH to 4-5, and the mixed solution is electromagnetically stirred for 0.5-2 h to obtain the hydrolysate of the silane coupling agent.

Further, in step S3, the silane coupling agent/plant fiber composite is prepared as follows: the pretreated plant fiber is immersed in the hydrolysate of the silane coupling agent and ultrasonically treated for 0.5-1 h to make the plant fiber fully immersed, and then the plant fiber is fished out and dried in the air, and the bath ratio of the plant fiber immersed in the hydrolysate of the silane coupling agent is (30-50):1. Specifically, the plant fiber may be placed in a ventilated place and dried in the air naturally in a lighted environment; and the drying standard is that when the surface is covered with absorbent paper, the absorbent paper is not significantly wetted.

Further, in step S4, the silica nanoparticle dispersion is prepared as follows: the silica nanoparticles are ultrasonically dispersed in deionized water to obtain the silica nanoparticle dispersion.

Further, the concentration of the silica nanoparticles is 2-20 mg/mL; and the particle size of the silica nanoparticles is 5-100 nm.

Further, in step S5, the silane coupling agent/silica nanoparticle/plant fiber composite is prepared as follows: the silane coupling agent/plant fiber composite dried in the air in step S3 is spread on gauze, a spray bottle is filled with the silica nanoparticle dispersion, and the silane coupling agent/plant fiber composite on the gauze is evenly sprayed once in a spraying mode, and then evenly sprayed again from the back of the gauze; the spraying process is repeated 2-5 times until the mass ratio of the plant fiber to the silica nanoparticles is 1 g:(30-100) mg; and the composite is dried at 115-125° C. for 12-15 h.

Specifically, in step S5, the silane coupling agent/silica nanoparticle/plant fiber composite is prepared as follows: the silane coupling agent/plant fiber composite dried in the air in step S3 is spread on gauze, and the silane coupling agent/plant fiber composite on the gauze is evenly sprayed once in a spraying mode using a spray bottle filled with the silica nanoparticle dispersion, and evenly sprayed again from the back of the gauze; in order to increase the amount of the silica nanoparticles coating the surface of the plant fiber, after being dried in the air at room temperature for 30-60 min, the gauze is shaken to change the angle of the fiber, and sprayed again; the spraying process is repeated 2-5 times until the mass ratio of the plant fiber to the silica nanoparticles is 1 g:(30-100) mg, wherein the mass of the plant fiber is the mass after pretreatment and drying; and the plant fiber is dried in a blast drying oven at 115-125° C. for 12-15 h to ensure formation of stable covalent bonds among the plant fiber, the silane coupling agent and the silica nanoparticles.

Beneficial effects of the present invention:

(1) The present invention uses a two-step method to modify the plant fiber. The surface of the plant fiber is firstly coated with the silane coupling agent, and then coated with the silica nanoparticles. If the hydrolysate of the silane coupling agent is compounded with the silica nanoparticles at first and then the plant fiber is immersed in the compound dispersion, the silanol group (Si—OH) formed by hydrolysis of the silane coupling agent and the Si—OH of the silica nanoparticles compete with each other when reacting with the hydroxyl group (—OH) on the surface of the plant fiber, which affects film formation of the silane coupling agent on the surface of the plant fiber, and greatly reduces the hydrophobic effect.

(2) The present invention uses a natural air-drying method to dry the silane coupling agent/plant fiber composite, and can effectively avoid a condensation reaction of the Si—OH group of the silane coupling agent in a high temperature environment, so that the activity of the silane coupling agent is maintained, and excess water is removed.

(3) Instead of immersing the silane coupling agent/plant fiber composite into the silica nanoparticle dispersion, the method of the present invention uses a spraying method to spray the silica nanoparticle dispersion onto the surface of the silane coupling agent/plant fiber composite, so that the silane coupling agent coating the surface of the plant fiber can be prevented from falling off due to secondary hydrolysis.

(4) The present invention uses relatively high temperature (115-125° C.) for drying the silane coupling agent/silica nanoparticle/plant fiber composite, so that Si—OH formed by hydrolysis of the silane coupling agent, Si—OH on the surface of the silica nanoparticles, and —OH on the surface of the plant fiber undergo a condensation reaction to form firm covalent bonds, and the surface of the plant fiber can be stably coated with the silane coupling agent and the silica nanoparticles.

(5) The silica nanoparticles coating the surface of the plant fiber have high activity and can undergo a pozzolanic reaction with the hydration product calcium hydroxide, so that the alkalinity and calcium hydroxide content around the fiber can be reduced, the erosion of the plant fiber can be reduced, and the resulting calcium silicate hydrate can improve the interfacial bonding property between the plant fiber and a cement matrix, which can be used for toughening a cement-based composite material.

(6) The silane coupling agent forms a hydrophobic film on the surface of the plant fiber, which can reduce the hydrophilicity of the plant fiber. On the one hand, the adsorption of a pore solution of cement paste can be reduced, and the corrosion resistance of the plant fiber is improved. On the other hand, the volume stability of the plant fiber is improved, a microstructure of a transition zone at the interface between the plant fiber and a cement matrix is optimized, and the interfacial bonding property between the fiber and the matrix is improved.

(7) In the silane coupling agent/silica nanoparticle/plant fiber composite prepared by the present invention, the synergistic effect of the silane coupling agent and the silica nanoparticles coating the surface of the plant fiber can improve the corrosion resistance of the plant fiber in the cement matrix, and improve the bonding property at the interface between the plant fiber and the cement matrix, which makes the plant fiber have great application prospects in toughening and arresting crack of cement-based materials.

BRIEF DESCRIPTION OF THE DRAWINGS

To illustrate the technical solutions of the embodiments of the present invention more clearly, the accompanying drawings used in the description of the embodiments are briefly introduced below. Obviously, the accompanying drawings in the following description are only some embodiments of the present invention. For those skilled in the art, other drawings can also be obtained from the accompanying drawings without any creative effort.

DETAILED DESCRIPTION OF THE EMBODIMENTS

Figure 1:
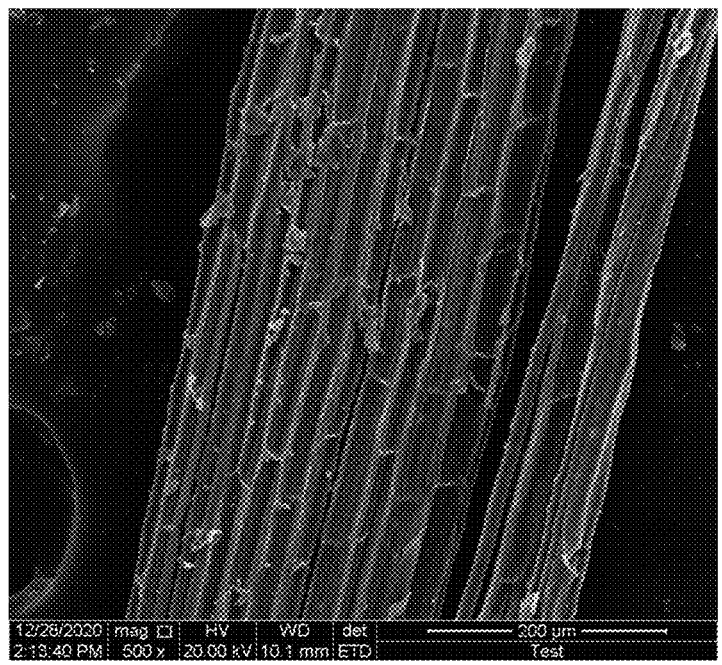
FIG. 1 is a scanning electron microscope (SEM) image of sisal fiber subjected to pretreatment in Embodiment 1 of the present invention.

The technical solutions in the embodiments of the present invention will be clearly and completely described below with reference to the accompanying drawings in the embodiments of the present invention. It is obvious that the described embodiments are only a part of the embodiments of the present invention and not all of the embodiments. The following description of at least one exemplary embodiment is merely illustrative in nature and is in no way intended to limit the present invention and application or uses thereof. Based on the embodiments of the present invention, all other embodiments obtained by those of ordinary skill in the art without creative efforts shall fall within the protection scope of the present invention.

Embodiment 1

A method for preparing a silane coupling agent/silica/plant fiber composite (the plant fiber was sisal fiber) included the following steps:

S1: The sisal fiber was pretreated; and the pretreatment process included the following concrete steps:

S1-1: the sisal fiber was cut into short fiber with the length of 100 mm according to requirements of a cement-based composite material to be toughened;

S1-2: the cut sisal fiber was cleaned off mud, sand and debris on the surface with clean water, and dried in a blast dryer at 60° C.; and S1-3: the cleaned sisal fiber was put in 0.15 mol/L of NaOH solution and soaked for 30 min; and the soaked sisal fiber was rinsed repeatedly with clean water to a neutral state, and dried in a blast dryer at 60° C. to complete pretreatment of the sisal fiber.

S2: Hydrolysate of a silane coupling agent was prepared; and the preparation of the hydrolysate of the silane coupling agent included the following steps:

S2-1: a silane coupling agent KH550 was dissolved in a mixed system of absolute ethanol and deionized water, and the mixed system was stirred evenly to obtain a mixed solution, wherein the volume ratio of the absolute ethanol to the deionized water was 4:1, and the concentration of the KH550 in the mixed solution was 0.2 mol/L; and S2-2: 30 wt % of glacial acetic acid was added to the mixed solution to adjust the pH to 4.66, and the mixed solution was stirred electromagnetically for 1 h to obtain the hydrolysate of the silane coupling agent (KH550).

S3: A silane coupling agent/sisal fiber composite was prepared: 6.0 g of the pretreated sisal fiber was immersed in 200 mL of the hydrolysate of the silane coupling agent (KH550) and ultrasonically treated for 0.5 h to fully immerse the sisal fiber; then the sisal fiber was fished out and put on gauze to drain excess water, and placed in a ventilated place to dry naturally for 24 h to obtain the silane coupling agent/sisal fiber composite.

S4: A silica nanoparticle dispersion was prepared: 0.3 g of silica nanoparticles was added to 20 mL of deionized water, first electromagnetically stirred for 0.5 h, and then ultrasonically vibrated for 30 min at the power of 600 W to obtain the silica nanoparticle dispersion; then a 100 mL spray bottle with a scale was filled with the silica nanoparticle dispersion for performing spraying in the next step, wherein the diameter of the silica nanoparticles was 50 nm.

S5: A silane coupling agent/silica nanoparticle/sisal fiber composite was prepared: the silane coupling agent/sisal fiber composite dried in the air in step S3 was spread on the gauze, and the silane coupling agent/sisal fiber composite on the gauze was evenly sprayed once in a spraying mode using the spray bottle filled with the silica nanoparticle dispersion, and evenly sprayed again from the back of the gauze; in order to increase the amount of the silica nanoparticles coating the surface of the sisal fiber, after being dried in the air at room temperature for 30 min, the gauze was shaken to change the angle of the fiber, and sprayed again; the total spray volume on the front and back sides every time was 5 mL, the spraying process was repeated 4 times, 20 mL of the silica nanoparticle dispersion was completely sprayed on the surface of the sisal fiber, and the mass ratio of the sisal fiber to the silica nanoparticles was 1 g/50 mg; after spraying, the sisal fiber was dried in a blast drying oven at 120° C. for 15 h to obtain the silane coupling agent/silica nanoparticle/sisal fiber composite.

Figure 2:
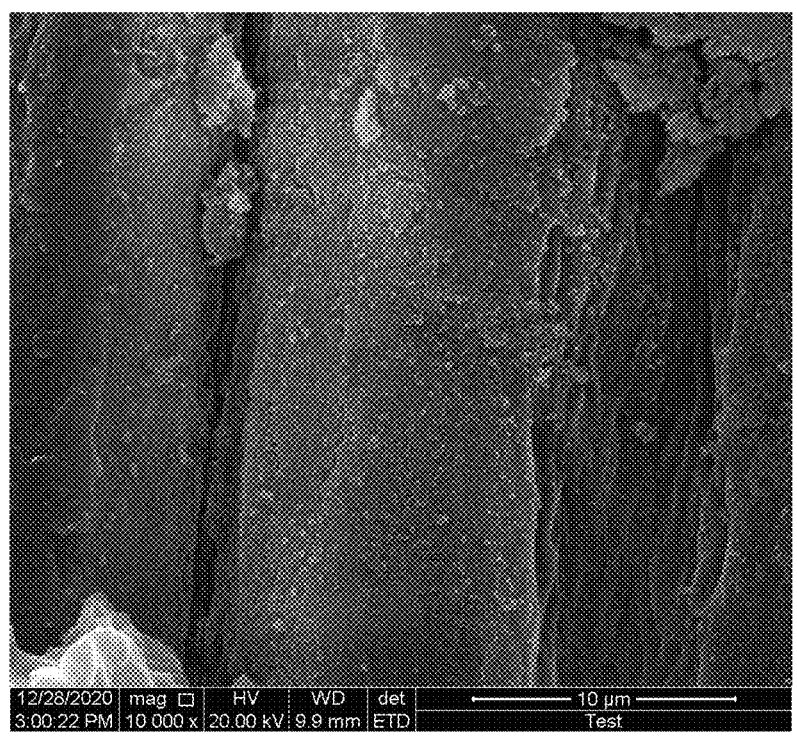
FIG. 2 is an SEM image of a silane coupling agent/silica nanoparticle/sisal fiber composite in Embodiment 1 of the present invention.

Test:

The pretreated sisal fiber in Embodiment 1 was tested with a scanning electron microscope (SEM), and the result was shown in FIG. 1. The silane coupling agent/silica nanoparticle/sisal fiber composite obtained in Embodiment 1 was tested by the SEM, as shown in FIG. 2.

Figure 3:
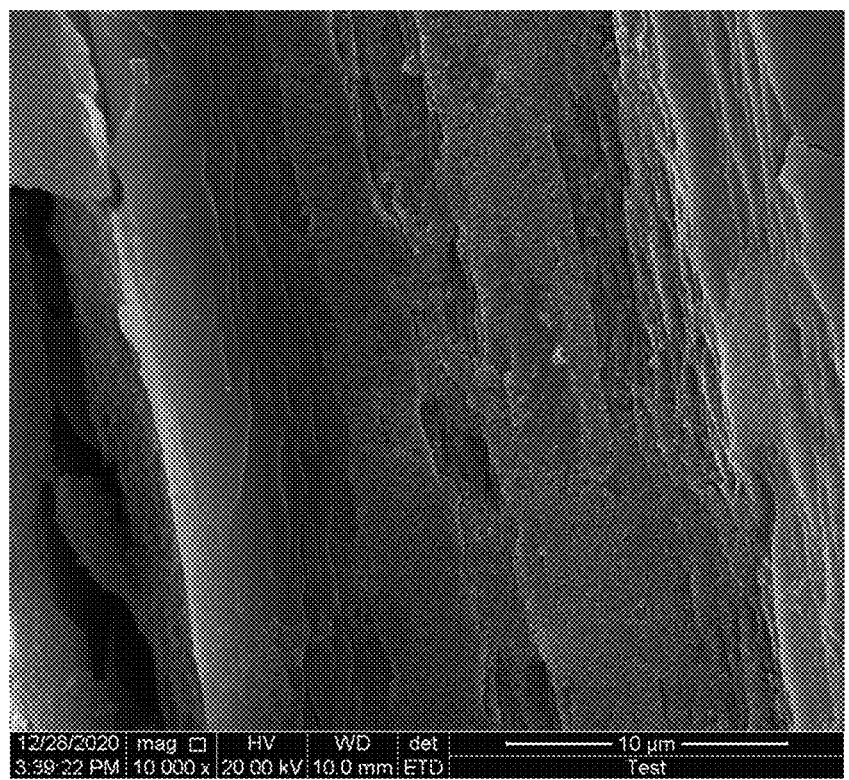
FIG. 3 is an SEM image of the silane coupling agent/silica nanoparticle/sisal fiber composite subjected to high-speed shearing treatment.

A high-speed shear test was performed on the silane coupling agent/silica nanoparticle/sisal fiber composite obtained in Embodiment 1. The high-speed shear test was to simulate the stress condition of fiber in a stirring pot, and the specific method was as follows: two-thirds of water by volume was added to a beaker, the prepared silane coupling agent/silica nanoparticle/sisal fiber composite was added, a magneton was added, and high-speed shearing was performed for 10 min. Then the silane coupling agent/silica nanoparticle/sisal fiber composite was taken out and dried, and shedding of $SiO_2$ particles from the fiber surface was observed under an electron scanning microscope. The results were shown in FIG. 3. It can be seen from FIG. 3 that the $SiO_2$ particles stably coat the surface of the plant fiber.

Figure 4:
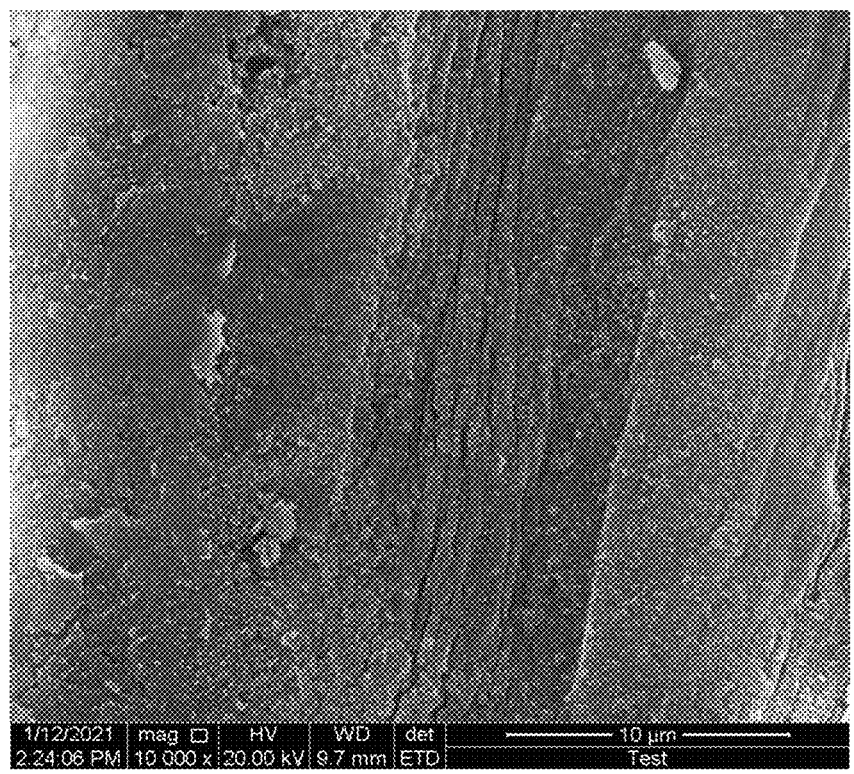
FIG. 4 is an SEM image of the silane coupling agent/silica nanoparticle/sisal fiber composite subjected to ultrasonic vibration treatment.

An ultrasonic vibration test was performed on the silane coupling agent/silica nanoparticle/sisal fiber composite obtained in Embodiment 1. Ultrasonic vibration treatment is a commonly used dispersion method for nanomaterials, and nanoaggregates are dispersed under the vibration of ultrasonic waves. In the test, whether silica nanoparticles on the modified fiber surface were stable under the action of ultrasonic vibration was verified by an ultrasonic method, and the specific method was as follows: two-thirds of water by volume was added to a beaker, and the modified fiber was added and vibrated in an ultrasonic vibrator at 600 W for 10 min. Then the modified fiber was taken out and dried, and shedding of silica particles from the fiber surface was observed under an electron scanning microscope. The results were shown in FIG. 4. It can be seen from FIG. 4 that the silica particles stably coat the surface of the plant fiber.

The method of the present invention focuses on "stable coating", and the above shearing and ultrasonic vibration tests are destructive tests performed on the compounded fiber, because in the practice of concrete production, stirring and friction will both wear and damage the coating on the fiber surface.

Embodiment 2

A method for preparing a silane coupling agent/silica/plant fiber composite (the plant fiber was coir fiber) included the following steps:

S1: The coir fiber was pretreated; and the pretreatment process included the following concrete steps:

S1-1: the coir fiber was cut into short fiber with the length of 50 mm according to requirements of a cement-based composite material to be toughened;

S1-2: the cut coir fiber was cleaned off mud, sand and debris on the surface with clean water, and dried in a blast dryer at 60° C.; and S1-3: the cleaned coir fiber was placed in 0.2 mol/L of NaOH solution and soaked for 30 min; and the soaked coir fiber was rinsed repeatedly with clean water to a neutral state, and dried in a blast dryer at 60° C. to complete pretreatment of the coir fiber.

S2: Hydrolysate of a silane coupling agent was prepared; and the preparation of the hydrolysate of the silane coupling agent included the following steps:

S2-1: a silane coupling agent KH792 was dissolved in a mixed system of absolute ethanol and deionized water, and the mixed system was stirred evenly to obtain a mixed solution, wherein the volume ratio of the absolute ethanol to the deionized water was 9:1, and the concentration of the KH792 in the mixed solution was 0.1 mol/L; and S2-2: 10 wt % of glacial acetic acid was added to the mixed solution to adjust the pH to 4.98, and the mixed solution was stirred electromagnetically for 0.5 h to obtain the hydrolysate of the silane coupling agent (KH792).

S3: A silane coupling agent/coir fiber composite was prepared: 4.0 g of the pretreated coir fiber was immersed in 150 mL of the hydrolysate of the silane coupling agent (KH792) and ultrasonically treated for 0.5 h to fully immerse the coir fiber; then the coir fiber was fished out and put on gauze to drain excess water, and placed in a ventilated place to dry naturally for 24 h to obtain the silane coupling agent/coir fiber composite.

S4: A silica nanoparticle dispersion was prepared: 0.3 g of silica nanoparticles was added to 30 mL of deionized water, first electromagnetically stirred for 0.5 h, and then ultrasonically vibrated for 30 min at the power of 600 W to obtain the silica nanoparticle dispersion; then a 100 mL spray bottle with a scale was filled with the silica nanoparticle dispersion for performing spraying in the next step, wherein the diameter of the silica nanoparticles was 10 nm.

S5: A silane coupling agent/silica nanoparticle/coir fiber composite was prepared: the silane coupling agent/coir fiber composite dried in the air in step S3 was spread on the gauze, and the silane coupling agent/coir fiber composite on the gauze was evenly sprayed once in a spraying mode using the spray bottle filled with the silica nanoparticle dispersion, and evenly sprayed again from the back of the gauze; in order to increase the amount of the silica nanoparticles coating the surface of the coir fiber, after being dried in the air at room temperature for 60 min, the gauze was shaken to change the angle of the fiber, and sprayed again; the total spray volume on the front and back sides every time was 10 mL, the spraying process was repeated 3 times, 30 mL of the silica nanoparticle dispersion was completely sprayed on the surface of the coir fiber, and the mass ratio of the coir fiber to the silica nanoparticles was 1 g/75 mg; after spraying, the coir fiber was dried in a blast drying oven at 120° C. for 12 h to obtain the silane coupling agent/silica nanoparticle/coir fiber composite.

Through the covalent interaction among a silanol group (Si—OH) formed by hydrolysis of the silane coupling agent, Si—OH of the silica, and a hydroxyl group (—OH) on the surface of the plant fiber, the method of the present invention enables silica nanoparticles to be firmly grafted on the surface of the plant fiber. Using a hydrophobic film formed by the silane coupling agent, harmful ions are prevented from invading, and the volume stability of the plant fiber is improved. Using the pozzolanic activity of the silica nanoparticles, the alkalinity and calcium hydroxide content around the fiber are reduced, a microstructure at the interface between the fiber and a cement matrix is improved, and the corrosion resistance of the plant fiber in the cement matrix and the interfacial bonding property between the fiber and the matrix are synergistically improved. In the composite prepared by the present invention, the synergistic effect of the silane coupling agent and the silica nanoparticles coating the surface of the plant fiber can improve the corrosion resistance of the plant fiber in the cement matrix, and improve the bonding property at the interface between the plant fiber and the cement matrix, which makes the plant fiber have great application prospects in toughening and arresting crack of cement-based materials.

The above preferred embodiments of the present invention are merely illustrative of the present invention, and are not intended to limit the present invention. Any obvious changes or variations derived from the technical solutions of the present invention are still within the protection scope of the present invention.

What is claimed is:

1. A method for preparing a silane coupling agent/silica/plant fiber composite, comprising the following steps:
    S1: pretreating a plant fiber to obtain a pretreated plant fiber;
    S2: preparing a hydrolysate of a silane coupling agent;
    S3: fully immersing the pretreated plant fiber in the hydrolysate of the silane coupling agent, fishing an immersed plant fiber out, and drying a resulting plant fiber in the air to obtain a silane coupling agent/plant fiber composite;
    S4: preparing a silica nanoparticle dispersion; and
    S5: spraying the silica nanoparticle dispersion onto the silane coupling agent/plant fiber composite, and drying a resulting composite to obtain a silane coupling agent/silica nanoparticle/plant fiber composite.

2. The method for preparing the silane coupling agent/silica/plant fiber composite according to claim 1, wherein in step S1, the plant fiber is pretreated by the following steps:

S1-1: cutting the plant fiber according to requirements of a cement-based composite material to be toughened to obtain a cut plant fiber;

S1-2: cleaning a surface of the cut plant fiber to obtain a cleaned plant fiber; and S1-3: soaking the cleaned plant fiber in an alkaline solution to obtain a soaked plant fiber, washing the soaked plant fiber to a neutral state to obtain a washed plant fiber, and drying the washed plant fiber to obtain the pretreated plant fiber.

3. The method for preparing the silane coupling agent/silica/plant fiber composite according to claim 2, wherein in step S1-3, the alkaline solution is an NaOH or KOH solution with a pH of 13-14; a soaking time is 0.5-1 h; and a drying temperature is 60-80° C.

4. The method for preparing the silane coupling agent/silica/plant fiber composite according to claim 1, wherein in step S2, the hydrolysate of the silane coupling agent is prepared by the following steps:

S2-1: dissolving the silane coupling agent in a mixed system of absolute ethanol and deionized water, and stirring a resulting mixed system evenly to obtain a mixed solution; and S2-2: adding glacial acetic acid to the mixed solution to adjust a pH of the mixed solution to an acidic state, and stirring the mixed solution to obtain the hydrolysate of the silane coupling agent.

5. The method for preparing the silane coupling agent/silica/plant fiber composite according to claim 4, wherein the silane coupling agent in step S2-1 is one selected from the group consisting of KH550, KH560, KH570, and KH792; a volume ratio of the absolute ethanol to the deionized water is (4-10):1; and a concentration of the silane coupling agent in the mixed solution is 0.1-1.0 mol/L.

6. The method for preparing the silane coupling agent/silica/plant fiber composite according to claim 4, wherein in step S2-2, 10-30 wt % of the glacial acetic acid is added to the mixed solution to adjust the pH of the mixed solution to 4-5, and the mixed solution is electromagnetically stirred for 0.5-2 h to obtain the hydrolysate of the silane coupling agent.

7. The method for preparing the silane coupling agent/silica/plant fiber composite according to claim 1, wherein in step S3, the silane coupling agent/plant fiber composite is prepared as follows: the pretreated plant fiber is immersed in the hydrolysate of the silane coupling agent and ultrasonically treated for 0.5-1 h to make the pretreated plant fiber fully immersed, and then the immersed plant fiber is fished out and dried in the air, wherein a bath ratio of the pretreated plant fiber immersed in the hydrolysate of the silane coupling agent is (30-50):1.

8. The method for preparing the silane coupling agent/silica/plant fiber composite according to claim 1, wherein in step S4, the silica nanoparticle dispersion is prepared as follows: silica nanoparticles are ultrasonically dispersed in deionized water to obtain the silica nanoparticle dispersion.

9. The method for preparing the silane coupling agent/silica/plant fiber composite according to claim 8, wherein a concentration of the silica nanoparticles in the silica nanoparticle dispersion is 2-20 mg/mL; and a particle size of the silica nanoparticles is 5-100 nm.

10. The method for preparing the silane coupling agent/silica/plant fiber composite according to claim 1, wherein in step S5, the silane coupling agent/silica nanoparticle/plant fiber composite is prepared as follows: the silane coupling agent/plant fiber composite obtained in step S3 is spread on a gauze, a spray bottle is filled with the silica nanoparticle dispersion, and the silane coupling agent/plant fiber composite on the gauze is evenly sprayed once in a spraying mode, and then evenly sprayed again from a back of the gauze; a spraying process is repeated 2-5 times until a mass ratio of a plant fiber of the silane coupling agent/plant fiber composite to silica nanoparticles from the silica nanoparticle dispersion is 1 g:(30-100) mg; and the resulting composite is dried at 115-125° C. for 12-15 h.

\* \* \* \* \*